(12) United States Patent
Ekanayake et al.

US008178141B2

(10) Patent No.: US 8,178,141 B2
(45) Date of Patent: May 15, 2012

(54) ARTICLES OF MANUFACTURE AND METHODS FOR ABSORBING GASSES RELEASED BY ROASTED COFFEE PACKED IN HERMETICALLY SEALED CONTAINERS

(75) Inventors: Athula Ekanayake, Cincinnati, OH (US); Paul Ralph Bunke, Cincinnati, OH (US)

(73) Assignee: The Folger Coffee Company, Orrville, OH (US)

( * ) Notice: Subject to any disclaimer, the term of this patent is extended or adjusted under 35 U.S.C. 154(b) by 775 days.

(21) Appl. No.: 11/044,251

(22) Filed: Jan. 27, 2005

(65) Prior Publication Data

US 2006/0165853 A1 Jul. 27, 2006

(51) Int. Cl.
*B65D 81/26* (2006.01)
(52) U.S. Cl. ........ 426/118; 426/124; 426/316; 426/595; 426/395
(58) Field of Classification Search .................. 426/124, 426/118, 131, 316, 595, 395
See application file for complete search history.

(56) References Cited

U.S. PATENT DOCUMENTS

| | | | | |
|---|---|---|---|---|
| 1,333,524 A | * | 3/1920 | Wilson | 252/192 |
| 1,441,696 A | * | 1/1923 | McNeil et al. | 252/190 |
| 1,872,026 A | * | 8/1932 | Carey | 252/192 |
| 2,322,206 A | * | 6/1943 | Gardenier | 252/189 |
| 2,430,663 A | * | 11/1947 | Behrman | 426/124 |
| 2,470,214 A | * | 5/1949 | Egan | 252/192 |
| 2,548,780 A | * | 4/1951 | Wright et al. | 264/143 |
| 2,997,445 A | * | 8/1961 | Nuhn | 252/192 |
| 3,419,400 A | * | 12/1968 | Hayhurst et al. | 426/124 |
| 3,489,693 A | * | 1/1970 | Bovard | 502/400 |
| 3,519,384 A | * | 7/1970 | Von Der Decken et al. | 423/230 |
| 3,557,011 A | * | 1/1971 | Colombo et al. | 252/189 |
| 3,761,289 A | * | 9/1973 | Wolf | 426/118 |
| 3,847,837 A | * | 11/1974 | Boryta | 502/400 |
| 3,990,872 A | * | 11/1976 | Cullen | 96/6 |
| 4,079,152 A | * | 3/1978 | Bedrosian et al. | 426/124 |
| 4,128,624 A | * | 12/1978 | Tamers | 423/439 |
| 4,166,807 A | * | 9/1979 | Komatsu et al. | 502/62 |
| 4,192,773 A | * | 3/1980 | Yoshikawa et al. | 502/62 |
| 4,366,179 A | * | 12/1982 | Nawata et al. | 426/395 |
| 4,407,723 A | * | 10/1983 | MacGregor et al. | 252/192 |
| 4,421,235 A | * | 12/1983 | Moriya | 206/524.2 |
| 4,518,704 A | * | 5/1985 | Okabayashi et al. | 502/80 |
| 4,552,767 A | * | 11/1985 | Saleeb et al. | 426/395 |
| 4,572,178 A | * | 2/1986 | Takase et al. | 128/205.27 |
| 4,579,223 A | * | 4/1986 | Otsuka et al. | 206/204 |
| 4,836,952 A | * | 6/1989 | Nasu et al. | 252/188.28 |
| 4,980,215 A | * | 12/1990 | Schonbrun | 428/72 |
| 5,038,768 A | * | 8/1991 | McGoff et al. | 128/202.26 |
| 5,322,701 A | | 6/1994 | Cullen et al. | |
| 5,667,863 A | * | 9/1997 | Cullen et al. | 428/68 |
| 6,059,860 A | * | 5/2000 | Larson | 95/117 |
| 6,451,423 B1 | * | 9/2002 | Armat et al. | 428/330 |
| 6,468,332 B2 | * | 10/2002 | Goglio et al. | 96/134 |
| 6,514,552 B1 | * | 2/2003 | Sivetz | 426/393 |
| 6,589,493 B2 | * | 7/2003 | Hosaka et al. | 423/230 |
| 6,660,240 B1 | * | 12/2003 | Toshihiko et al. | 423/247 |
| 6,866,702 B2 | * | 3/2005 | Mitsuda | 96/134 |
| 7,235,274 B2 | * | 6/2007 | Archibald et al. | 426/128 |
| 2003/0010787 A1 | | 1/2003 | Dalton et al. | |
| 2003/0064014 A1 | * | 4/2003 | Kumar et al. | 423/210 |
| 2004/0170780 A1 | * | 9/2004 | Giraud | 428/34.1 |
| 2004/0185153 A1 | * | 9/2004 | Hekal | 426/392 |
| 2004/0241290 A1 | * | 12/2004 | El-Afandi | 426/108 |

FOREIGN PATENT DOCUMENTS

| | | |
|---|---|---|
| EP | 176371 | 4/1986 |
| EP | 241917 | 10/1987 |
| EP | 1213228 | 6/2002 |
| JP | 57-11977 | 6/1955 |
| JP | 56-091842 | 7/1981 |
| JP | 56-130222 | 10/1981 |
| JP | 58-141776 | * 8/1983 |
| JP | 58-166935 | * 10/1983 |
| JP | 58-177137 | * 10/1983 |
| JP | 60-70065 | * 4/1985 |
| JP | 61-245845 | 11/1986 |
| JP | 1-164418 | * 6/1989 |
| JP | 02-042940 | 2/1990 |
| JP | 2-43917 | * 2/1990 |
| JP | 03-133368 | 6/1991 |
| JP | 03-198741 | 8/1991 |
| JP | 04-008248 | 1/1992 |
| JP | 05-092140 | 4/1993 |

OTHER PUBLICATIONS

PCT International Search Report, Date of Mailing Jan. 18, 2006, 4 Pages.
Office action from Japanese Application Serial No. 2007-553136 dated Sep. 1, 2009.
Communication from European Application No. 06718732.8 dated Feb. 6, 2008.
Response from European Application No. 06718732.8 dated May 28, 2008.
Communication from European Application No. 06718732.8 dated Feb. 10, 2010.
Office Action for Canadian Patent Application No. 2,620,265, dated Sep. 24, 2010.
Response to Office Action for European Patent Application No. 06718732.8, filed Jun. 21, 2010.
Response to Office Action for Japanese Patent Application No. 2007-553136, filed Dec. 28, 2009.
Decision to Grant Japanese Patent Application No. 2007-553136, Jan. 21, 2010.
Office Action for Mexican Patent Application No. MX/a/2007/008582, dated Nov. 9, 2010.
Decision to Grant European Patent Application No. 06718732.8, Dec. 2, 2010.
Response to Office Action for Mexican Patent Application No. MX/a/2007/008582, filed Jan. 5, 2011.

(Continued)

*Primary Examiner* — Drew Becker
*Assistant Examiner* — Luana Z Long
(74) *Attorney, Agent, or Firm* — Calfee, Halter & Griswold LLP

(57) ABSTRACT

Articles of manufacture and methods for absorbing gasses released by roaster coffee packed in hermetically sealed containers.

40 Claims, No Drawings

OTHER PUBLICATIONS

Office Action mailed Feb. 23, 2010, for Canadian Patent Application No. 2,620,265.

Response from Canadian Application No. 2,620,265 dated Aug. 23, 2010.

Notice of Allowance for Mexican Patent Application No. MX/a/2007/008582 dated Feb. 1, 2011.

Notice of Allowance for Canadian Patent Application No. 2,620,265 dated May 26, 2011.

Written Opinion of the International Searching Authority (PCT/US2006/001703) dated Jul. 27, 2007.

* cited by examiner

ARTICLES OF MANUFACTURE AND METHODS FOR ABSORBING GASSES RELEASED BY ROASTED COFFEE PACKED IN HERMETICALLY SEALED CONTAINERS

FIELD OF THE INVENTION

The present invention relates to articles of manufacture and methods for absorbing gasses released by roasted coffee packed in hermetically sealed containers.

BACKGROUND OF THE INVENTION

It is well-known that from the time the green coffee beans are roasted they generate and release gasses, such as carbon dioxide and, to a lesser degree, carbon monoxide, in a process known as "off-gassing." Over time, off-gassing of packed coffee can cause an increase in the internal pressure of a hermetically sealed coffee container. To negate this increase in internal pressure, coffee containers have historically been constructed of rigid materials, such as metals, and are subjected to vacuum before sealing. Indeed, until recently, if a consumer purchased roast and ground coffee, the most common option available was a metal coffee can. And while metal coffee cans generally remain sealed, thereby keeping the coffee inside fresh, such containers are not without problems. For example, metal coffee cans often add to the purchase price of the product since producing the metal cans can be costly, and because the cans must be packed under vacuum. Another concern with metal cans is that when the cans are filled with coffee, they are heavy and may be difficult to handle for those suffering from hand, arm or joint conditions, such as arthritis.

As a way to address some of the foregoing concerns with metal coffee cans, manufacturers have recently begun making semi-rigid roast and ground coffee containers. Such containers are constructed from materials other than metal. One alternative is constructing the container from a plastic, such as a polyolefin. See U.S. patent application Ser. No. 10/155,338. Making the container from plastic reduces the cost of manufacturing and shipping the product, and also increases the ease of handling by reducing the weight of the product, and allowing for easy-to-grip handles to be molded into the container.

In spite of these advantages, semi-rigid containers are still not without issues. It has been discovered that if the semi-rigid container is vacuum packed similar to metal cans, the container has a tendency to collapse or distort. This distortion often leads to failure of the closure seal of the container. To remedy this problem, the coffee is often degassed prior to packing. Degassing involves storing the freshly roasted coffee in holding bins for extended periods of time, known as the "hold time," prior to packing. This hold time allows the off-gasses generated to evolve and dissipate. Often, degassing takes several days. By degassing the coffee, the problem of internal pressure build-up and closure seal failure is reduced. However, closure failure may also arise when transporting the semi-rigid containers through changes in altitude and temperature because such environmental changes also affect the release of off-gases from coffee and thus, the pressure exerted on the container. These environmental changes in pressure are known as pressure differentials. Due to the flexible nature of the containers, pressure differentials may also result in the containers contorting or collapsing. Again, this can damage the closure seal and allow atmospheric oxygen into the container, which can stale the coffee.

It has been discovered that one way to account for pressure differentials is to place a one-way valve in the closure of the container as described in U.S. application Ser. No. 10/155, 338. Placing a valve in the closure eliminates the need for hold time, since off-gasses evolving after packaging are released through the valve. Additionally, such a valve aptly accounts for pressure differentials as the packed coffee is transported through differing altitudes and temperatures.

However, placing a one-way valve in the closure of the container also has its attendant problems. When shipping such containers over increasing elevations, these valves continue to release off-gasses in order to equilibrate with the decreasing atmospheric pressures. As the elevation decreases, the container is subject to continuously increasing atmospheric pressure to which the container cannot equilibrate, due to one-way valve now being closed. This increase in atmospheric pressure compresses the container and pushes down on the seal to form a dish like appearance. Such 'dishing' exposes the seal area of the container to high stress which can cause closure failure, and consequently, staling of the coffee. Often, additional plastic must be used to reinforce the seal area of the container to account for this increase in seal stress.

Additionally the off-gases that escape from the containers via one-way valves can fill the empty parts of the enclosed shipping trailer, thereby reducing oxygen levels to undesirably low levels.

Therefore it is desirable to devise a way to package freshly roasted coffee in hermetically sealed containers such that the one-way valve is no longer required, yet the closure seal remains intact, and the product remains fresh.

SUMMARY OF THE INVENTION

The present invention relates to articles of manufacture and methods for absorbing gasses released by roasted coffee packed in hermetically sealed containers.

In particular, in one embodiment, the present invention relates to an article of manufacture comprising a container of roasted coffee, an absorbent and a catalyst.

In another embodiment, the present invention relates to an article of manufacture comprising a semi-rigid container of roast and ground coffee, an absorbent comprising a mixture of calcium hydroxide and sodium hydroxide, and a catalyst comprising a mixture of oxides of copper and manganese, wherein the absorbent and catalyst are packaged in a form comprising a sachet.

In still another embodiment, the present invention relates to a method of absorbing off-gasses released by roasted coffee packed in a hermetically sealed container, the method comprising the steps of providing a container of roast coffee, placing an absorbent and a catalyst in the container, and hermetically sealing a closure onto the container.

DETAILED DESCRIPTION OF THE INVENTION

A. Definitions

As used herein, the term "absorbent" refers to a compound, or mixture of compounds, capable of absorbing at least about 0.15 grams of carbon dioxide per 1 gram of absorbent at 22° C. and 1 atmosphere of pressure. While many compounds capable of absorbing carbon dioxide satisfy the foregoing requirement for carbon dioxide absorption, some examples of absorbents acceptable for use herein include, but are not limited to, calcium, lithium, sodium, potassium, rubidium, cesium, magnesium, strontium, oxides thereof, hydroxides thereof and combinations thereof.

As used herein, the term "catalyst" means any catalyst that induces ambient temperature oxidation of carbon monoxide. Common catalysts acceptable for use herein include, but are not limited to, the Hopcalite class of catalysts, as well as copper oxides, manganese oxides, zinc oxides, cerium oxides and combinations thereof. Additionally, the catalyst may comprise gold finely dispersed on transition metal oxides.

As used herein, the term "closure" means a removable film or laminate that can be sealed to the open top of a container to provide a hermetic environment. The closure may be constructed of, for example, single or multi-layered flexible laminates.

As used herein, the term "comprising" means various components can be cojointly employed in the methods and articles of this invention. Accordingly, the terms "consisting essentially of" and "consisting of" are embodied in the term comprising.

As used herein, the term "container" means any semi-rigid or rigid canister that can be filled with roasted, and optionally ground, coffee and hermetically sealed. By "semi-rigid" it is meant that the shape of the container can be distorted without the use of excessive force. Numerous materials may be used to construct such semi-rigid containers, including, for example, polyolefins. Some examples of polyolefin compounds suitable for use herein, include, but are not limited to, polycarbonate, low-density polyethylene, high-density polyethylene, polyethylene terephalate, polypropylene, polystyrene, polyvinyl chloride, co-polymers thereof and combinations thereof. By "rigid" it is meant that the shape of the container cannot be distorted without the use of excessive force, rather it is fixed. Some examples of rigid materials suitable for use herein include, metals, such as, for example, steel and tin.

As used herein, the term "form" is used to describe the packaging options for the absorbents and catalysts of the present invention. Some of the more common forms acceptable for use herein include, but are not limited to, filled pouches, packs and sachets, molded articles and combinations thereof. It will be recognized that the absorbent and the catalyst may be placed in the container together or separately. Use of the singular "form" is intended to include embodiments where the two materials are placed in the container separately.

As used herein, the term "mixture" means two or more components in varying proportions. The mixtures described herein may comprise from about 0.1% to about 99.9%, by weight of the mixture, of each component contained therein.

As used herein, the term "off-gasses" refer to the gasses diffusing from roasted coffee, particularly carbon dioxide and carbon monoxide.

As used herein, the term "roasted coffee" means the roasted form of any green coffee of commerce, which may be either whole bean or ground.

As used herein, the term "scavenger" means any compound capable of absorbing oxygen, such as iron or iron oxides.

B. Article of Manufacture

The present article of manufacture comprises three elements: a container comprising roasted coffee, one or more absorbents and one or more catalysts. Optionally, a scavenger may be included.

The absorbent and catalyst of the present invention are useful for converting and absorbing off-gasses released from freshly roasted coffee packed in hermetically sealed containers. As aforementioned, freshly roasted coffee releases gasses, namely carbon dioxide and carbon monoxide, during a process known as off-gassing. If coffee is packed immediately after roasting, these off-gasses can build-up within the airtight container, often resulting in damage to the closure seal if packed in a semi-rigid container, or a significant bulge if packed in a non-vacuum packed rigid container. The present inventors have surprisingly discovered that by placing and absorbent and a catalyst within a container of roasted coffee prior to hermetic sealing, the off-gasses can be converted, then absorbed, thereby maintaining the internal pressure of the container and preserving the container and/or the functionality of the closure seal.

This internal conversion and absorption of off-gasses provides several benefits. First, it eliminates the need for extensive hold times because the coffee can be packed almost immediately after roasting. Second, it eliminates the need for vacuum packing as the off-gasses are absorbed before they can damage the container. Third, the coffee remains fresher and more aromatic as atmospheric oxygen is prevented from entering the container. Fourth, the containers can be produced at a reduced cost compared to standard metal cans or containers requiring valves. Fifth, the present invention prevents pressure differentials from distorting or collapsing the container as the container is being transported. Finally, the present invention helps maintain the oxygen level within the shipping trailers used to transport the product. Additional benefits will become apparent to those skilled in the art.

As aforementioned, the present absorbent and catalyst are designed for use with hermetically sealed containers, including both semi-rigid and rigid containers. Semi-rigid containers may be constructed of materials such as polyolefins. Some examples of polyolefin compounds suitable for use herein, include, but are not limited to, polycarbonate, low-density polyethylene, high-density polyethylene, polyethylene terephalate, polypropylene, polystyrene, polyvinyl chloride, co-polymers thereof and combinations thereof. Optionally, these compounds may contain thin layers of metal, such as aluminum. Rigid containers may be constructed of materials such as metals, including, but not limited to, tin and steel. It will be understood by those skilled in the art that the present container may take any number of shapes and sizes, but generally has an open top that is capable of being hermetically sealed with a single or multi-layered closure, such as, for example, a flexible laminate. In an alternate embodiment, the present container may be a hermetically sealed flexible laminate bag having a sealed top that can be opened by the consumer by pulling apart the seam.

The ability of the present invention to convert and absorb the off-gasses released by the coffee is due to the presence of both an absorbent and a catalyst.

The absorbent used in the present invention works by trapping carbon dioxide released by the coffee during the off-gassing process. For purposes of the present invention, an absorbent is any material or combination of materials capable of absorbing at least about 0.15 grams of carbon dioxide per 1 gram of absorbent at 22° C. and 1 atmosphere of pressure. In one embodiment, the absorbent will be capable of absorbing at least about 0.25 grams of carbon dioxide per 1 gram of absorbent at 22° C. and 1 atmosphere of pressure. In another embodiment, the absorbent will be capable of absorbing at least about 0.50 grams of carbon dioxide per 1 gram of absorbent at 22° C. and 1 atmosphere of pressure. In yet another embodiment, the absorbent will be capable of absorbing at least about 0.70 grams of carbon dioxide per 1 gram of absorbent at 22° C. and 1 atmosphere of pressure. In still another embodiment, the absorbent will be capable of absorbing at least about 0.85 grams of carbon dioxide per 1 gram of absorbent at 22° C. and 1 atmosphere of pressure. Typically, the absorbent will be capable of absorbing from about 0.15 grams to about 0.92 grams of carbon dioxide per 1 gram of material at 22° C. and 1 atmosphere of pressure. While many compounds capable of absorbing carbon dioxide satisfy the foregoing requirement for carbon dioxide absorption, some examples of absorbents acceptable for use herein include, but are not limited to, calcium, lithium, sodium, potassium, rubidium, cesium, magnesium, strontium, oxides thereof, hydroxides thereof and combinations thereof. In one embodiment, the absorbent comprises a mixture of calcium hydroxide and sodium hydroxide. In another embodiment, the absorbent comprises calcium hydroxide.

One example of such an absorbent is Sofnolime®, manufactured by Molecular Products Limited, Mill End, Thaxted, Essex, United Kingdom. Its composition is about 75% calcium hydroxide, about 3% sodium hydroxide, about 17% water and about 5% impurities such as calcium carbonate. About 1 gram of Sofnolime® can absorb about 0.5 grams (or about 260 mL) carbon dioxide at 22° C. and 1 atmosphere of pressure.

The aforementioned trapping of off-gasses is accomplished by the mechanism indicated in the following equation, which uses calcium hydroxide for illustration purposes:

$$CO_2 + Ca(OH)_2 = CaCO_3 + H_2O$$

As shown in the foregoing equation, the absorbent, in this instance calcium hydroxide, reacts with carbon dioxide to form calcium carbonate and water. In other words, the calcium hydroxide is converted to calcium carbonate in the present absorbent, while the negligible amount of water that is generated may either be absorbed by the present absorbent or evaporated off if the surrounding conditions permit.

The absorbent generally begins as small pellets or granules, but may be either ground to a fine powder for use in a gas permeable sachet or pouch, or combined with a plastic and molded, as will be fully described below.

The next component of the articles of the present invention is a catalyst. During the off-gassing process, and particularly near the end of the off-gassing process, it is known that roasted coffee generates and releases carbon monoxide. The catalyst is used herein to convert carbon monoxide into carbon dioxide, which may then be absorbed by the absorbent in the manner described previously. Any catalyst that induces ambient temperature oxidation of carbon monoxide may be used in the present invention. These catalysts include, but are not limited to, the Hopcalite class of catalysts, as well as copper oxides, manganese oxides, zinc oxides, cerium oxides and combinations thereof. Additionally, the catalyst may comprise gold dispersed on transition metal oxides. If the catalyst comprises a mixture, roughly equal portions of each catalyst may be used. In one embodiment, the catalyst comprises a mixture of copper oxide and manganese oxides. In another embodiment, the catalyst comprises a mixture of copper oxide and zinc oxide. As an example, one catalyst acceptable for use herein is Moleculite® manufactured by Molecular Products Limited, Mill End, Thaxted, Essex, United Kingdom. Its composition is about 45% copper oxide and about 55% manganese dioxide.

The conversion of carbon monoxide to carbon dioxide occurs as indicated in the following equation:

$$2CO + O_2 = 2CO_2$$

As shown in the above equation, the carbon monoxide bonds with the oxygen present in the head space of the hermetically sealed container to form carbon dioxide, which may then be absorbed by the absorbent in the manner described above.

Similar to the absorbent, the catalyst generally begins as small pellets or granules, but may be either ground to a fine powder, for use in a gas permeable sachet or pouch, or combined with a plastic and molded, as will be fully described below.

Additionally, transient oxygen remaining in the container after complete conversion of carbon monoxide to carbon dioxide by the aforementioned catalyst may optionally be absorbed by a scavenger such as iron or iron oxide. Like the absorbent and catalyst, the scavenger may be in granular form or ground to a fine powder for use in a gas permeable sachet or pouch, or the scavenger may be combined with a plastic and molded, as described below.

As aforementioned, numerous packaging forms of the present absorbent and catalyst may be used to achieve the desired benefits. Some of the more common forms include, but are not limited to, filled pouches, packs and sachets, molded articles and combinations thereof. Such pouches, packs and sachets may be made from, for example, plastic impregnated paper or a non-woven polymeric composition. Molded articles comprise the absorbent and/or catalyst mixed with a plastic, as described below. The absorbent and catalyst may also be incorporated into the container itself by forming a porous layer of the components on the inside surface of the container such that the porous layer will be in contact with the coffee.

Moreover, the forms may be used in a variety of ways. For instance, a sachet may be added to the container before filling with coffee, while being filled with coffee, or placed on top of the coffee after packing, but prior to sealing. As another example, a pouch may be adhered to the internal face of the container closure. Alternately, the form may comprise a porous molded article, such as a scoop or disc. In an additional embodiment, the absorbent and catalyst may be admixed with a polyolefin, and the mixture can then be used to make the container itself. Moreover, similar to the sachets and pouches, molded articles may be placed in the container before, while or after filling the container with coffee, or such articles may be adhered to the container or closure. It will be understood by those skilled in the art that any form that makes the absorbent and catalyst accessible to off-gasses is acceptable for use herein. While the production of porous polymer articles is known to those skilled in the art, a brief description is provided below.

Typically, polymeric beads are ground to a powder and admixed with a component, such as, for instance, an absorbent of the present invention. Controlled heat and pressure are then applied to the admixture in a mold, which causes the polymer to partially yield and melt and the junctions between the polymer beads to fuse together and trap the absorbent. The actual temperature, pressure and time used to achieve melting and fusing can be controlled to produce an article having a consistent porosity. Those skilled in the art will understand that these factors, namely temperature, pressure and time, will vary according to the absorbent and catalyst used, as well as the dimensions of the molded article being made.

Upon cooling, the polymer re-solidifies to produce a visually and geometrically solid article. However, while the article appears solid, it remains porous and permeable due to the incomplete melting of the polymer. It is this porosity that allows the trapped absorbent or catalyst to be accessible to gasses present within the container.

The present inventors have found that regardless of the size of the container, the ratio of absorbent to catalyst to roasted coffee is optimally from about 24:1:2200 to about 18:1:2200. In another embodiment, the ratio is from about 7:1:733 to about 5:1:440. In yet another embodiment, the ratio is about 4:1:366. It has been found that this particular range of ratios provides enough absorbent and catalyst to effectively convert and trap the off-gasses of the coffee and maintain the internal pressure of the container, while simultaneously minimizing the size of the packaging form.

C. Method

The present method begins by providing a container for packing freshly roasted coffee. As previously indicated, the container may generally be constructed of any semi-rigid or rigid material, and in one embodiment, comprises a polyolefin.

Next, coffee beans are roasted and, optionally ground, according to common practices known in the art. There is no longer a need for an extensive holding time to account for off-gassing, and thus, the coffee can be packed in the container almost immediately after roasting. As aforementioned, the present absorbent and catalyst may be added to the container either before filling the container with coffee, while filling the container with coffee or after filling the container with coffee. Timing of the addition of the absorbent and catalyst, as well as the placement thereof within the container, will vary depending on which form is used. In the case where the absorbent and catalyst are an integral part of the container, such as a porous layer, there is no need to add additional absorbent and catalyst in another form, such as, for example, a sachet.

Finally, once the coffee, absorbent and catalyst are in the container, the container may be hermetically sealed according to any method known in the art, such as, heat sealing or induction sealing. For example, in heat sealing, a laminate sheet closure comprising foil and polymer is placed over the container opening with the polymer side adjacent to the container. A heated platen is then pressed against the laminate sheet causing the laminate to melt and fuse to the container. The temperature of the platen can be determined by the melting point of the polymer used in the laminate. The pressure applied is adjusted so that adequate contact is made between the laminate and the container, but should not be so strong as to distort the container or damage the laminate. The dwell time during which the platen is applied is determined by both the heat transfer through the laminate sheet as well as by the time needed to sufficiently melt the polymer. Once the polymer of the laminate sheet is melted, the platen is removed and the container is cooled, re-solidifying the polymer and fusing the two together. Excess laminate beyond the sealed container may be trimmed or cut away. Once the laminate closure is fused to the container, the container is said to be hermetically sealed.

As aforementioned, the purpose of including the present absorbent and catalyst in the container is to maintain the internal pressure of the container until the closure is opened by the consumer. Once the container is opened for the first time, it is no longer necessary for the absorbent and catalyst to remain within the container, thus, they may be disposed of. For example, in one embodiment, the absorbent and catalyst are in the form of sachets that are adhered to the bottom of the container closure. Such sachets may be disposed of, along with the closure, after the consumer has opened the container.

While it is intended that the absorbent and catalyst are removed after opening the container, it is not necessary that this is the case. Allowing the absorbent and catalyst to remain in the container during use of the coffee will not alter the coffee in any way. Therefore, in another embodiment, the absorbent and catalyst may be placed in the container prior to filling the container with coffee. For instance, the absorbent and catalyst may take the form of sachets that are placed in the bottom of the container before the coffee is added. The sachets will still function properly to maintain the internal pressure of the coffee container, but may remain in the container after the container is opened by the consumer. In another embodiment, the absorbent and catalyst may be molded into index card-sized articles and adhered to the sidewall of the semi-rigid container. In this embodiment, the absorbent and catalyst will remain in the container throughout use.

EXAMPLES

Example 1

Freshly roasted whole coffee beans are cooled to room temperature and allowed to degass for about five hours. The beans are then ground to a mean particle size of about 700 μm and allowed to degas for an additional time of about 10 min. About 1 kg of the roast & ground coffee is then packed into a semi-rigid container as described herein.

A pouch made of non-woven polymeric material is filled with about 12 g of calcium hydroxide that has been ground to a mean particle size of about 425 μm and about 0.5 g of a mixture copper oxide and manganese dioxide that has also been ground to a particle size of about 425 μm. The pouch is divided into two internal sections to keep the calcium hydroxide separate from the copper oxide/manganese dioxide catalyst.

Once the absorbent and catalyst are in the pouch, the pouch is sealed and adhesively attached to a laminate closure, which is then hermetically sealed to the container opening. The laminate closure does not have a valve. As the coffee continues to off-gas, the catalyst converts carbon monoxide to carbon dioxide and the absorbent absorbs the carbon dioxide. The internal pressure of the container is maintained and the closure remains intact.

Example 2

Freshly roasted and ground coffee is prepared and placed in a semi-rigid container as in Example 1. Calcium hydroxide containing about 3% sodium hydroxide is ground to a powder having a mean particle size of about 425 μm and placed in a tightly closed, dry glass jar. Similarly, 3 g Moleculite® is ground to a mean particle size of about 425 μm and placed in a second tightly closed, dry glass jar.

About 12 g of the calcium hydroxide is mixed with about 5 grams of polyethylene and placed in a disc-shape mold having a diameter of about 3 cm and a thickness of about 3 mm. The mold containing the calcium hydroxide/polyethylene mixture is then subjected to a temperature and pressure adequate to sufficiently melt the mixture. After cooling to room temperature, the disc is removed from the mold.

Similarly, about 3 g of Moleculite® catalyst is mixed with about 10 g of polyethylene and placed in a disc shape mold having a diameter of about 3 cm and a thickness of about 3 mm. As with the absorbent/polyethylene mixture, the mold containing the catalyst/polyethylene mixture is subjected to a temperature and pressure adequate to sufficiently melt the mixture. After cooling to room temperature, the disc is removed from the mold.

The two discs are placed in the bottom of an empty container and the container is filled with coffee. The container is hermetically sealed with a laminate closure. The laminate closure does not have a valve. As the coffee continues to off-gas, the catalyst converts carbon monoxide to carbon dioxide and absorbent absorbs the carbon dioxide. The internal pressure of the container is maintained and the closure remains intact.

Example 3

About 375 g of freshly roasted and ground coffee is filled into a metal container and two non-woven pouches, one containing about 4 g of Sofnolime® absorbent and one containing about 1 g of Moleculite® catalyst, are placed on top of the coffee. The container is then hermetically sealed using a can seamer. The container does not have a one-way valve. The off-gasses evolved from the roast and ground coffee are converted by the catalyst and absorbed by the absorbent. The internal pressure within the container remains about 1-2 psi below atmospheric pressure.

Example 4

Whole coffee beans are roasted according to common practices and held for about 5 hours to cool them allow some off-gasses to evolve. The roasted coffee is ground to a particle size of about 700 μm and packed into semi-rigid containers, with about 1100 g of coffee per container. A non-woven pouch containing both about 12 g of Sofnolime® and about 3 g of Moleculite® are prepared and placed on the coffee in the container. The container is then hermetically sealed with a laminated foil closure. The closure does not have a one-way valve. The off-gasses evolved by the roast and ground coffee are converted and absorbed by the Sofnolime® and Moleculite®, and the seal remains intact after 4 months of storage.

All documents cited in the present specification are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article of manufacture comprising:
    a) a container of roasted coffee;
    b) an absorbent in the container selected from the group consisting of calcium, lithium, sodium, potassium, rubidium, cesium, magnesium, strontium, oxides thereof, hydroxides thereof and mixtures thereof; and
    c) a catalyst in the container comprising a mixture of copper oxide and manganese dioxide,
    wherein the ratio of absorbent to catalyst to coffee is from about 18:1:2200 to about 4:1:366.

2. The article of claim 1 wherein the container is rigid or semi-rigid.

3. The article of claim 2 wherein the absorbent comprises a mixture of calcium hydroxide and sodium hydroxide.

4. The article of claim 2 wherein the absorbent and the catalyst are each packaged in a form selected from the group consisting of a pack, pouch, sachet, molded article, and combinations thereof.

5. The article of claim 4 wherein the form is adhered to the container.

6. The article of claim 4 wherein the form is adhered to a closure of the container.

7. The article of claim 4 wherein the form is a molded article.

8. The article of claim 7 wherein the molded article is a scoop or a disk.

9. The article of claim 4 wherein the absorbent is calcium hydroxide.

10. The article of claim 9 further comprising a scavenger wherein the scavenger is selected from iron or iron oxide.

11. The article of claim 2 wherein the absorbent and catalyst are mixed together and packaged in a form of a single pack, pouch, or sachet.

12. The article of claim 11 wherein the form is adhered to the container.

13. The article of claim 11 wherein the form is adhered to a closure of the container.

14. The article of claim 2 wherein the container is semi-rigid, and wherein the absorbent and the catalyst are each incorporated into the container.

15. The article of claim 2 wherein the absorbent and catalyst are each separately packaged in a respective form selected from the group consisting of a pack, pouch, and sachet.

16. An article of manufacture comprising:
    a. a semi-rigid container of roast and ground coffee;
    b. an absorbent in the container comprising a mixture of calcium hydroxide and sodium hydroxide; and
    c. a catalyst in the container comprising a mixture of copper oxide and manganese dioxide; wherein the absorbent and the catalyst are packaged in a form comprising a pack, pouch, or sachet,
    wherein the ratio of absorbent to catalyst to coffee is from about 18:1:2200 to about 4:1:366.

17. The article of claim 16 wherein the absorbent and the catalyst are mixed together and packaged in a form of a single pack, pouch, or sachet.

18. The article of claim 17 wherein the form is adhered to the container.

19. The article of claim 17 wherein the form is adhered to a closure of the container.

20. The article of claim 16 wherein the absorbent and the catalyst are each separately packaged in a respective form selected from the group consisting of a pack, pouch, and sachet.

21. The article of claim 20 wherein the form is adhered to the container.

22. The article of claim 20 wherein the form is adhered to a closure of the container.

23. The article of claim 20 further comprising a scavenger wherein the scavenger is selected from iron or iron oxide.

24. A method of absorbing off-gasses released by roasted coffee packed in a hermetically sealed container, the method comprising the steps of:
    a. providing a container of roasted coffee;
    b. placing an absorbent and a catalyst in the container
        i. wherein the absorbent is selected from the group consisting of calcium, lithium, sodium, potassium, rubidium, cesium, magnesium, strontium, oxides thereof, hydroxides thereof and mixtures thereof, and
        ii. wherein the catalyst comprises a mixture of copper oxide and manganese dioxide, and
        iii. wherein the ratio of absorbent to catalyst to coffee is from about 18:1:2200 to about 4:1:366; and
    c. hermetically sealing a closure onto the container.

25. The method of claim 24 wherein the container is rigid or semi-rigid.

26. The method of claim 25 wherein the container is semi-rigid, and wherein the absorbent and the catalyst are each incorporated into the container.

27. The method of claim 24 wherein the absorbent and the catalyst each comprise a form selected from the group consisting of a pack, pouch, sachet, molded article, and combinations thereof.

28. The method of claim 27 wherein the form is adhered to the container.

29. The method of claim 27 wherein the form is adhered to a closure of the container.

30. The method of claim 27 wherein the form is a molded article.

31. The method of claim 30 wherein the molded article is a scoop or a disk.

32. The method of claim 27 further comprising the step of placing a scavenger in the container wherein the scavenger is selected from iron or iron oxide.

33. The method of claim 24 wherein the absorbent and catalyst are mixed together and packaged in a form of a single pack, pouch, or sachet.

34. The method of claim 33 wherein the form is adhered to the container.

35. The method of claim 33 wherein the form is adhered to a closure of the container.

36. The method of claim 24 wherein the absorbent and catalyst are each separately packaged in a respective form selected from the group consisting of a pack, pouch, and sachet.

37. An article of manufacture comprising:
  a. a semi-rigid container of roasted coffee;
  b. an absorbent in the container comprising calcium hydroxide; and
  c. a catalyst in the container comprising a mixture of copper oxide and manganese dioxide,
  wherein the absorbent and the catalyst are mixed together and packaged in a form of a single pack, pouch, or sachet, and
  wherein the ratio of absorbent to catalyst to coffee is about 24:1:2000.

38. An article of manufacture comprising:
  a. a semi-rigid container of roasted coffee;
  b. an absorbent in the container comprising a mixture of calcium hydroxide and sodium hydroxide; and
  c. a catalyst in the container comprising a mixture of copper oxide and manganese dioxide,
  wherein the absorbent and the catalyst are each packaged in a form of a molded article, and
  wherein the ratio of absorbent to catalyst to coffee is about 4:1:333.

39. An article of manufacture comprising:
  a. a semi-rigid container of roasted coffee;
  b. an absorbent in the container comprising a mixture of calcium hydroxide and sodium hydroxide; and
  c. a catalyst in the container comprising a mixture of copper oxide and manganese dioxide,
  wherein the absorbent and the catalyst are each packaged in a form of a pack, pouch, or sachet, and
  wherein the ratio of absorbent to catalyst to coffee is from about 18:1:2200 to about 4:1:375.

40. An article of manufacture comprising:
  a. a semi-rigid container of roasted coffee;
  b. an absorbent in the container comprising a mixture of calcium hydroxide and sodium hydroxide; and
  c. a catalyst in the container comprising a mixture of copper oxide and manganese dioxide,
  wherein the absorbent and the catalyst are mixed together and packaged in a form of a single pack, pouch, or sachet, and
  wherein the ratio of absorbent to catalyst to coffee is from about 18:1:2200 to about 4:1:366.

* * * * *